United States Patent
Ellis et al.

(10) Patent No.: US 7,334,056 B2
(45) Date of Patent: Feb. 19, 2008

(54) SCALABLE ARCHITECTURE FOR CONTEXT EXECUTION

(75) Inventors: Jackson Lloyd Ellis, Fort Collins, CO (US); Kurt J. Kastein, Fort Collins, CO (US); Praveen Viraraghavan, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 413 days.

(21) Appl. No.: 10/914,296

(22) Filed: Aug. 9, 2004

(65) Prior Publication Data

US 2006/0031602 A1  Feb. 9, 2006

(51) Int. Cl.
  *G06F 13/28* (2006.01)
(52) U.S. Cl. ............... 710/22; 710/38; 710/52
(58) Field of Classification Search .......... 710/22, 710/308, 11, 105, 315, 129, 310
  See application file for complete search history.

(56) References Cited

U.S. PATENT DOCUMENTS

| | | | | |
|---|---|---|---|---|
| 5,768,530 A | * | 6/1998 | Sandorfi | 709/233 |
| 5,835,788 A | * | 11/1998 | Blumer et al. | 710/23 |
| 5,909,595 A | * | 6/1999 | Rosenthal et al. | 710/38 |
| 6,026,448 A | * | 2/2000 | Goldrian et al. | 709/212 |
| 6,134,617 A | * | 10/2000 | Weber | 710/105 |
| 6,243,783 B1 | * | 6/2001 | Smyers et al. | 710/310 |
| 6,330,626 B1 | * | 12/2001 | Dennin et al. | 710/52 |
| 2004/0123013 A1 | * | 6/2004 | Clayton et al. | 710/310 |

* cited by examiner

*Primary Examiner*—Henry Tsai
*Assistant Examiner*—Henry Yu
(74) *Attorney, Agent, or Firm*—Yee & Associates (57) ABSTRACT

System, apparatus and method for controlling the movement of data in a data processing system. The apparatus receives commands from at least one protocol engine and generates contexts representing the commands. The contexts are a data structure representing information for programming data transfers pursuant to the commands. Instruction requests based on the contexts are issued to the at least one protocol engine and to at least one DMA to efficiently control the movement of data to/from the at least one protocol engine from/to a local memory. The functions within the system are partitioned in a way that allows functions to be scaled for better performance and/or to support different protocols.

14 Claims, 6 Drawing Sheets

| Field | High Byte | Byte 2 | Byte 1 | Low Byte |
|---|---|---|---|---|
| 10 | Spare7 | Spare6 | Spare5 | Spare4 |
| 9 | WWN (LSW) | | | |
| 8 | WWN (MSW) | | | |
| 7 | Spare0 | Context Configuration Bits | | |
| 6 | LSA | | | |
| 5 | Spare3 | Host Segment Base Address | | |
| 4 | Segment Size | | TAG | |
| 3 | Spare2 | Host Address Pointer | | |
| 2 | Spare1 | Status Byte | Transfer Length | |
| 1 | R | Next Pointer | Release Length | |
| 0 | Reserved | Host Segment Ceiling Address | | |

SCALABLE ARCHITECTURE FOR CONTEXT EXECUTION

BACKGROUND OF THE INVENTION

1. Technical Field

The present invention relates generally to the data processing field and, in particular, to a system, apparatus and method for controlling the movement of data in a data processing system.

2. Description of the Related Art

One function of a data processing system is to move data based on a request from an external system. For efficient operation, it is important that the data processing system maintain good data movement between a requestor and a final storage medium, whether the final storage medium is a disk drive, cd-rom drive, tape drive, flash memory or the like.

There are many approaches to controlling the movement of data based on a request from an external system. One approach is to use a microprocessor to process every boundary in the data flow via service interrupts. For example, when a request is made, an interrupt can be asserted communicating to the microprocessor that a new command is available. The microprocessor can then evaluate the command and determine the size of the data transaction. If the request is a write command, the microprocessor allocates space to store the data, in either an internal or an external storage medium, and then processes the incoming data. A similar process is followed to read data from a storage medium in response to a read command.

Other approaches use hardware only or some combination of both hardware and software to control data movement. In hardware-only approaches, the hardware handles every aspect of the data movement. In approaches that use both hardware and software, the hardware processes a command, allocates memory space for the data, and moves the data; and the microprocessor intervenes in the data flow as needed, either at specifically located boundaries along the data flow, or the microprocessor can be enabled to have visibility anywhere along the flow.

A microprocessor-only approach to controlling data movement generally provides poor performance and requires a large amount of code to process all the different possible scenarios that may occur. A hardware-only solution is normally not feasible because of size and complexity, and because any changes in protocol would not be able to adapt into the fixed hardware design.

A hybrid approach, utilizing hardware with microprocessor intervention, to handle the data flow can alleviate the problems encountered in the microprocessor-only and hardware-only approaches; however, an issue arises as to the locations of the boundaries at which control of the data flow should be transferred between the hardware and the microprocessor. Specifically, a determination must be made as to which aspects of the data flow should be managed by the hardware and which aspects of the data flow should be handled by the microprocessor. If boundaries are set incorrectly, flexibility provided by the microprocessor might be lost. If the microprocessor is assigned too much responsibility, the above-described inadequacies of the microprocessor-only approach begin to arise. Increasing the responsibility of the hardware can provide better overall performance; however, if a hardware problem arises after completion of development, the microprocessor cannot be used to work around the problem, and an uncorrectable flaw might result.

The ability to accommodate new interface protocols for different applications is becoming increasingly important in the data processing field due to the ever-increasing rate at which new generations of application specific integrated circuits (ASICs) are being developed. In such an environment, it is desirable that a system for controlling the movement of data be able to accommodate multiple configurations without requiring significant and fundamental changes to the system.

There is, accordingly, a need for a system for efficiently controlling the movement of data in a data processing system that can accommodate multiple configurations without requiring fundamental changes to the system.

SUMMARY OF THE INVENTION

The present invention provides a system, apparatus and method for controlling the movement of data in a data processing system. The apparatus receives commands from at least one protocol engine and generates contexts representing the commands. The contexts are a data structure representing information for programming data transfers pursuant to the commands. Instruction requests based on the generated contexts are issued to the at least one protocol engine and to at least one DMA (Direct Memory Access) to efficiently control the movement of data to/from at least one protocol engine from/to a local memory. The functions within the apparatus are partitioned in a way that allows the functions to be scaled for better performance and/or to support different protocols.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
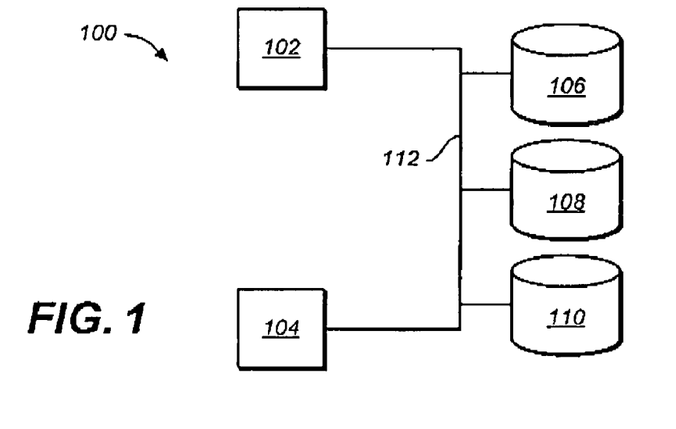
FIG. 1 is a pictorial representation of a data processing system in which the present invention may be implemented.

With reference now to the figures and in particular with reference to FIG. 1, a pictorial representation of a data processing system in which the present invention may be implemented is depicted. Data processing system 100 includes computer systems 102 and 104 connected to subsystems 106, 108 and 110. These subsystems are disk drive subsystems in the depicted example. Computer systems 102 and 104 are connected to subsystems 106, 108 and 110 by bus 112. Bus 112 may be implemented using a number of different architectures such as a Small Computer System Interface (SCSI) architecture or a fiber channel (FC) architecture.

Figure 2:
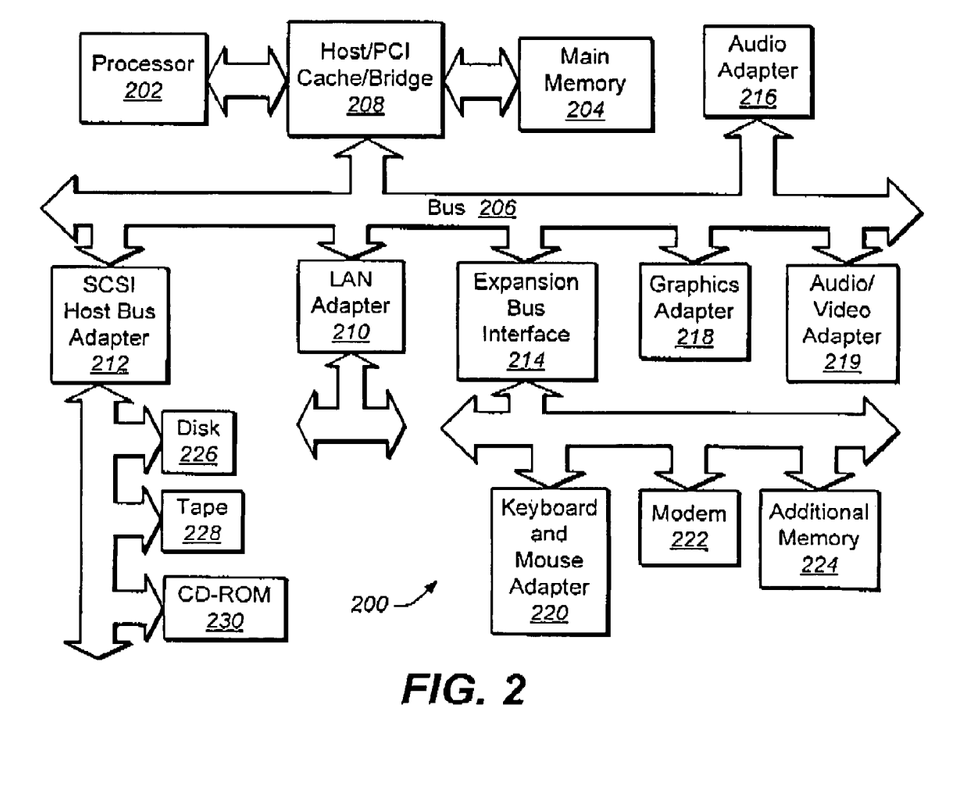
FIG. 2 is a block diagram of a data processing system is in which the present invention may be implemented.

FIG. 2 is a block diagram of a data processing system in which the present invention may be implemented. Data processing system 200 is an example of a computer system, such as computer system 102 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 202 and main memory 204 are connected to PCI local bus 206 through Host/PCI/Cache/Bridge 208. Host/PCI/Cache/Bridge 208 also may include an integrated memory controller and cache memory for processor 202. Additional connections to PCI local bus 206 may be made through direct component interconnection or through add-in, connectors. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228 and CD-ROM drive 230. Typical PCI local bus implementations will support three or four PCT expansion slats or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

The depicted example in FIG. 2 and above-described examples are also not meant to imply architectural limitations. For example, data processing system 200 may be a notebook computer or a hand-held computer.

The processes of the present invention are performed by processor 202 using computer implemented instructions, which may be located in a memory such as, for example, main memory 204, additional memory 224, or in one or more peripheral devices 226-230.

Figure 3:
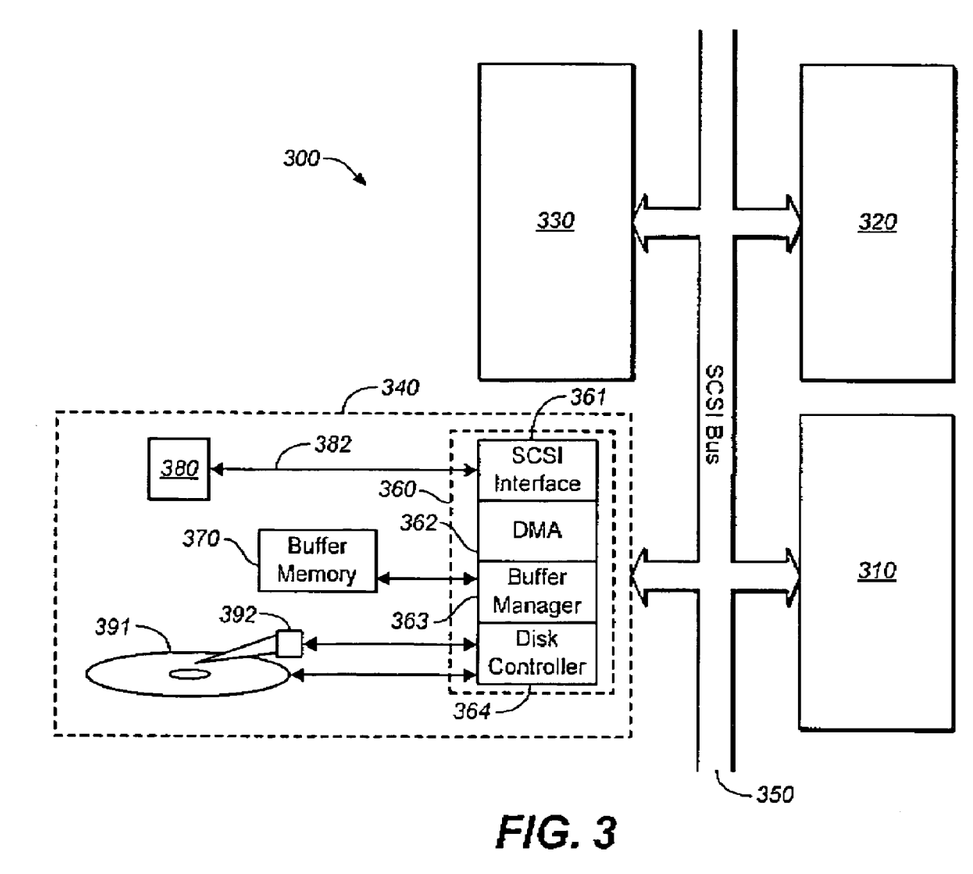
FIG. 3 is a block diagram that illustrates a bus configuration for a data processing system in which the present invention may be implemented.

FIG. 3 is a block diagram that illustrates a bus configuration for a data processing system in which the present invention may be implemented. The bus configuration, generally designated by reference number 300, is a SCSI bus in the depicted example, and includes requestor devices 310 and 320 and target devices 330 and 340 coupled to bus 350. Target device 340 is a hard disk computer peripheral device comprising controller 360, buffer memory 370, microprocessor 380, hard disk 391, and hard disk servo 392. Controller 360 includes functional blocks such as SCSI interface 361 DMA 362, buffer manager 363 and disk controller 364. Controller 360 includes interfaces to buffer memory 370, microprocessor 380, read/write interface to hard disk 391 and hard disk servo 392. Microprocessor interface 382 is connected to and controls the functional blocks depicted as SCSI interface 361, DMA 362, buffer manager 363 and disk controller 364.

Figure 4:
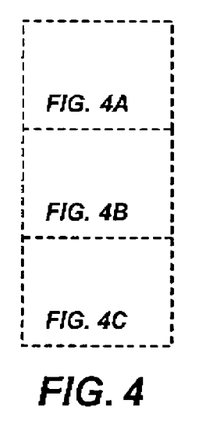
FIGS. 4A, 4B and 4C together illustrate a block diagram of a system for controlling the movement of data in a data processing system in accordance with a preferred embodiment of the present invention.
Figure 4A:
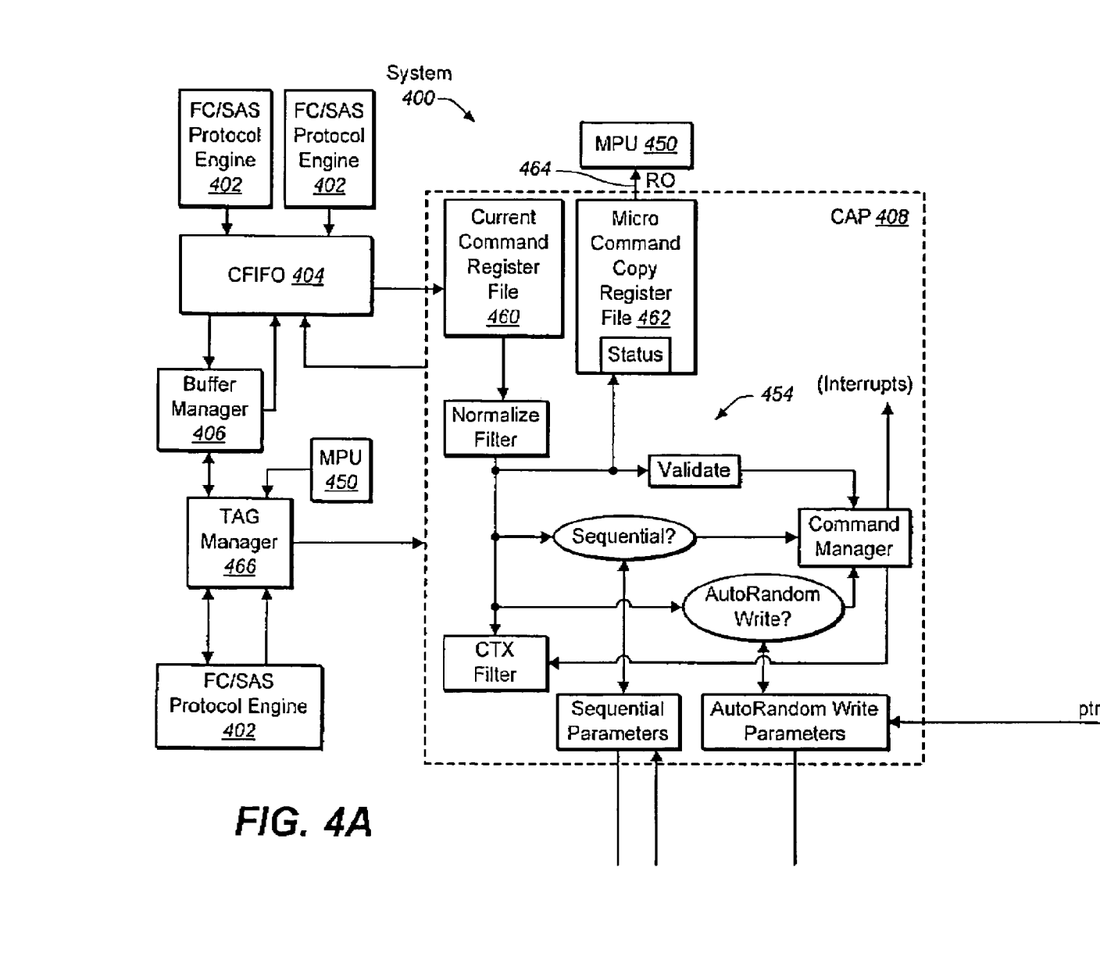
Figure 4B:
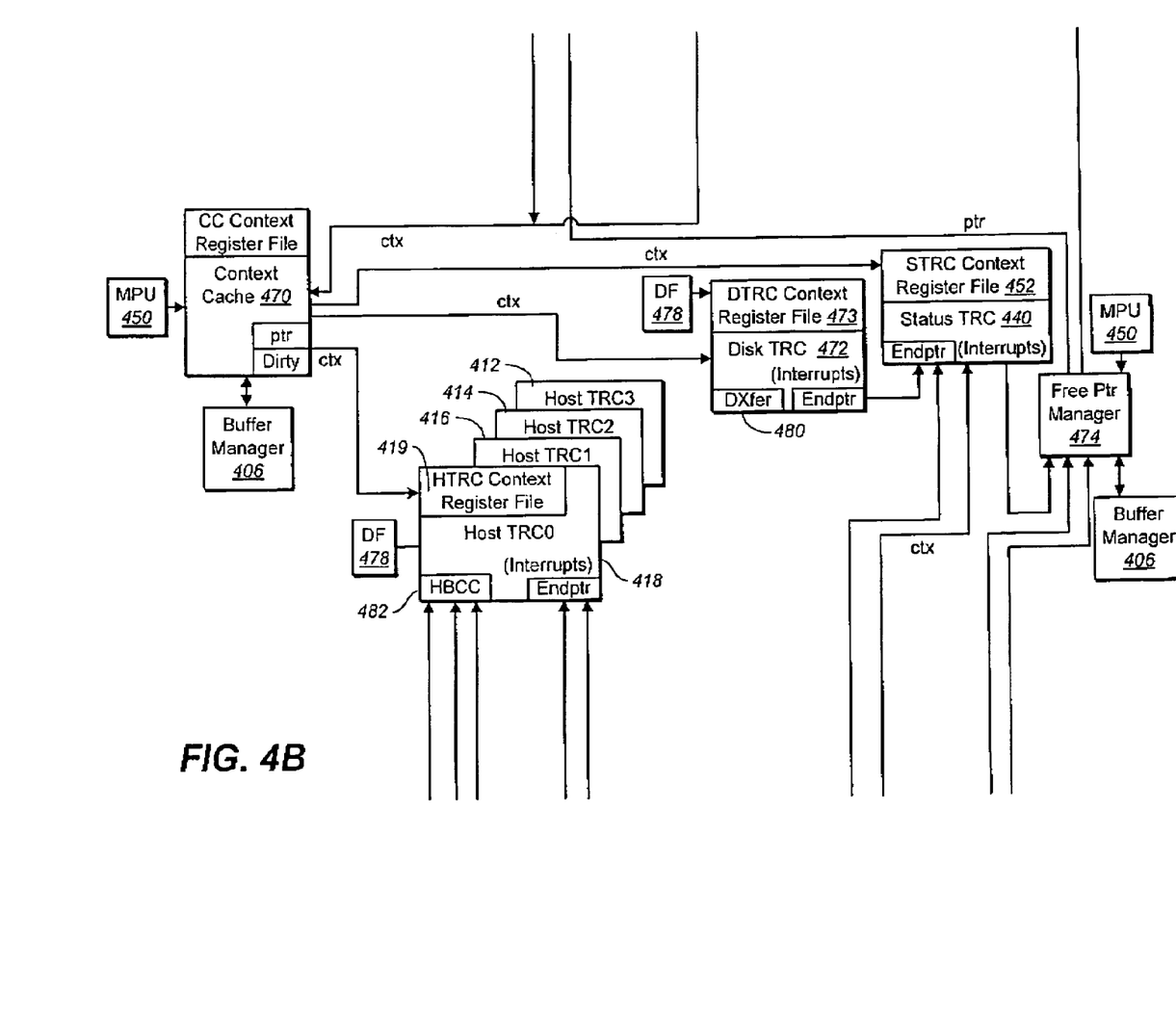
Figure 4C:
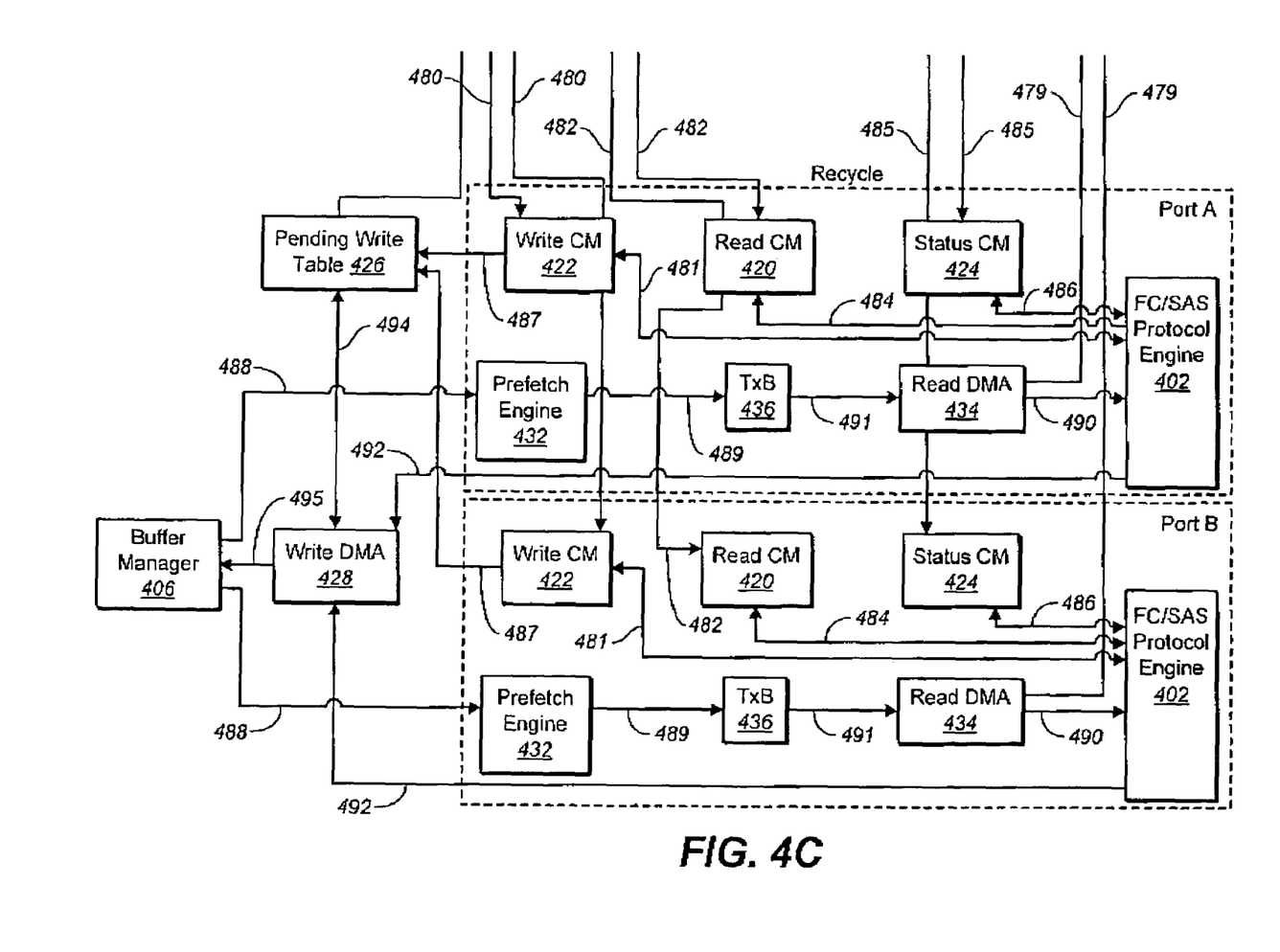

FIGS. 4A, 4B and 4C together illustrate a block diagram of a system for controlling the movement of data in a data processing system in accordance with a preferred embodiment of the present invention. The system is generally designated by reference number 400, and controls the movement of data to and from a storage medium, such as hard disk 391 in FIG. 3, based on a request from an external system. As will be described in detail hereinafter, system 400 has an architecture that includes a foundational block referred to as a Host Thread Retrieval Channel (HTRC) to help execute a standard information format known as "contexts". The architecture of the system of the present invention enables commands and data to be managed for multiple protocols such as parallel SCSI, Serial Attached SCSI (SAS) and Fibre Channel (FC).

In order to facilitate an understanding of the operation of system 400, an overview of the operation will first be provided.

System 400 includes an architecture that interfaces with an FC/SAS protocol engine 402 at each of two Ports A and B, although it should be understood that the architecture can also be expanded to support multiple port applications. System does not communicate directly with the protocol of choice. The system architecture can receive commands and write data and transmit status and read data. The system architecture is optimized for queuing as many requests for write data, read data and status as possible on the same connection from up to four concurrent threads of data contexts and one concurrent thread of status contexts. These commands become contexts and are presented to a FC/SAS protocol engine and separate DMA (Direct Memory Access) as instructions.

System 400 receives commands from FC/SAS Protocol Engine 402 of either Port A or Port B into Command FIFO (CFIFO) 404 that is implemented in an external buffer (not shown) connected to a buffer manager 406. These commands are then pulled out of CFIFO 404 into Command Automation Processor (CAP) 408 in order to validate and then attempt automation of the commands if automation is enabled. CAP 408 can automate random write commands as well as sequential read or write threads of commands. CAP 408 can also automate sequential threads that start with a random write command. Either CAP 408 or firmware generates DMA contexts to represent these commands into lists of contexts that can be stored in the external buffer. Four Host Thread Retrieval Channels (HTRCs) 412, 414, 416 and 418 read these contexts from buffer lists one at a time and decide when data instruction requests are issued to FC/SAS Protocol Engine 402, based on the connection status and nexus of the bus, and whether enough data or space exists in the external buffer to be worth taking the overhead to connect to the protocol bus. As will be explained more fully hereinafter, HTRCs 412-418 are able to assert instruction requests that are passed on to FC/SAS Protocol Engine 402 in either of Ports A or B. FC/SAS Protocol Engine 402 reviews all the requests and decides which DMA context or status context is allowed to be transferred next.

There are three context managers in each port: Read Context Manager (RCM) 420, Write Context Manager (WCM) 422 and Status Context Manager (SCM) 424. The three Context Managers prioritize instruction requests to FC/SAS Protocol Engine 402 associated with their respective port to efficiently transfer multiple contexts on the same bus connection or to initiate a bus connection while not connected. Write instruction requests are sent on a bus to indicate the amount of write data that can currently be accepted for this command. System 400 supports up to eight outstanding write instructions by using Pending Write Table (PWT) 426. When FC/SAS Protocol Engine 402 determines to issue a write instruction request on the bus, the information for that instruction is stored in an on-Chip memory in PWT 426 for retrieval by Write DMA (WDMA) 428 when the write data is later received. Both ports A and B share PWT 426 and WDMA 428. Read instruction requests are for read data, which is processed in Prefetch Engine (PENG) 432 and Read DMA (RDMA) 434. As shown in FIGS. 4A, 4B and 4C, Ports A and B each have their own PENG 432, Transmit Buffer (TxB) 436 and RDMA 434 data path. Status instruction requests can be generated in the protocol engine based on the data instructions originated in an HTRC 412-418 for reads and cached writes, or in a Status Thread Retrieval Channel (STRC) 440 for non-cached writes. Read status instruction requests are generated in FC/SAS protocol engine 402 when the remaining command transfer length equals zero. For writes, an instruction request comes from SCM 424 and is processed completely within FC/SAS Protocol Engine 402.

Figure 5:
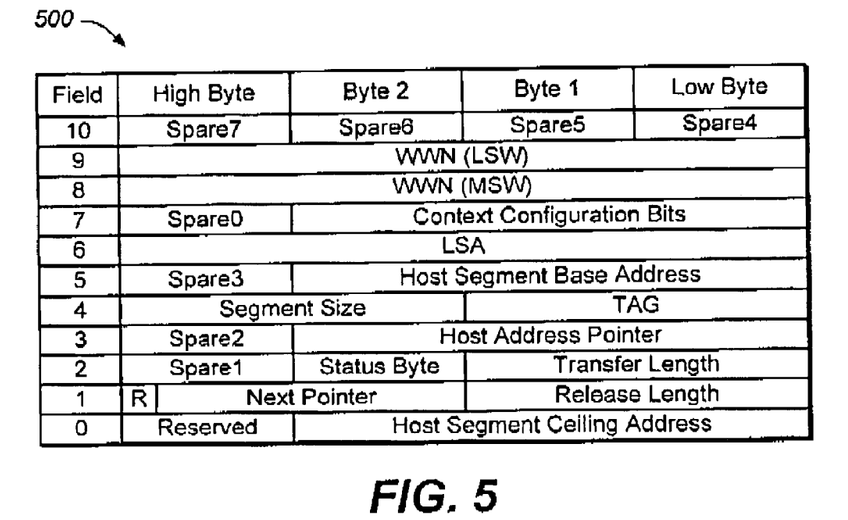
FIG. 5 illustrates a context table in accordance with a preferred embodiment of the present invention.

A "context" is a key concept in the architecture of system 400. A "context" represents all the information required to reprogram a DMA transfer for a new command. A context format in the architecture in accordance with the present invention is a constant data structure from the point of view of microprocessor (MPU) 450 so that microprocessor 450 can read or write in the same manner whether the particular context is one on the buffer lists, or is in an on-chip context register file such as the one in HTRC context register file 419. FIG. 5 illustrates a context table 500 in accordance with a preferred embodiment of the present invention.

Contexts are a basic data structure that is passed from block to block. Either CAP 408 or system firmware can create the contexts. When a context is created, it is appended to a linked list of contexts which can be represented both in the hardware lists in the buffer or in firmware memory until the firmware is ready to append them to buffer lists that a TRC can retrieve and execute. The context also contains a port bit, indicating from which of Ports A or B the command was received. The context is moved from the buffer lists to a context register file associated with each HTRC 412-418 (HTRC context register file 419), STRC 440 (STRC context register file 452) and Disk Thread Retrieval Channel (DTRC) 472 (DTRC context register file 473). RCM 420 maintains a copy of the context before passing it to PENG 432 and RDMA 434 (PENG 432 and RDMA 434 each also keep a copy of the context in their local register files). PWT 426 and WDMA 428 also operate on copies of the context. PWT 426 gets its original copy from an HTRC via WCM 422 and WDMA 428 fetches its context from PWT 426 for the corresponding write data received from FC/SAS Protocol Engine 402. When WDMA 428 is finished transferring data for this context, it puts the context back into PWT 426. Each context can only cover one command, but each command can be represented by multiple contexts. CAP 408 always creates one context per command but the firmware can create context lists that implement various types of scatter gather operations. An HTRC 412-418 can also break one command into several instructions, each for a portion of the overall transfer length. A list of contexts that are linked together can be executed by an HTRC 412-418 until the list of contexts is complete.

The various components of architecture 401 will now be described in greater detail.

Command FIFO (CFIFO) 404 receives commands from FC/SAS Protocol Engine 402 at either Port A or Port B. When FC/SAS Protocol Engine 402 receives commands, CFIFO 404 takes the commands out of FIFOs local in FC/SAS Protocol Engine 402 and writes them into the buffer in which CFIFO 404 is implemented. The buffer (for example, a 32 Meg SDRAM, can be very deep to allow the system to receive many commands into CFIFO 404. Then, in the basic flow, CAP 408 requests commands, as the microprocessor and hardware automation are ready to receive new commands. CFIFO 404 retrieves these commands from the buffer in the order that they were brought in and presents them to CAP 408.

CAP 408 is a block for command automation. CAP 408 receives commands from CFIFO 404, decides if one of two possible types of command automation is possible; and, if so, generates context data structures for these commands and appends the generated contexts into linked lists of contexts which are stored in the external buffer. If the command has any error field that prevents automation, or if automation is not enabled, the command is given to microprocessor 450. Microprocessor 450 can review the command and either continues to use CAP 408 to generate a context for the command or it can store the command in its own command or thread queue. If microprocessor 450 wishes, it can implement all the commands or thread queues in the buffer by linking each new command to the appropriate context list in the buffer. Each buffer list of contexts can represent commands of the same sequential thread or commands of a different thread. It should be noted that CAP 408 allows microprocessor 450 to operate completely independent from the state of the FC/SAS interface bus.

CAP 408 contains two command register files, Current Command Register File 460 and Micro Command Copy Register File 462. All commands are initially received from CFIFO 404 into Current Command Register File 460. As generally illustrated at 454, commands are evaluated against parameters that define if the command can be automated. If not, or if any validity checks fail, the command is copied to Micro Command Copy Register File 462. As indicated by arrow 464, microprocessor 450 is given visibility to new commands at Micro Command Copy Register File 462.

TAG Tables are kept in a buffer. A TAG Manager 405 is associated with FC/SAS Protocol Engine 402 to add or delete TAGS from the table in the buffer. When the FC/SAS Protocol Engine receives a new command, it requests that this command's TAG be added to the TAG Table. When FC/SAS Protocol Engine 402 transmits status for a command, it requests that this command's TAG be deleted from the TAG Table.

The Context Cache (CC) 470 is a central hub where contexts (depicted in FIGS. 4A-4C as signals "ctx")are routed between CAP 408, the four HTRCs 412, 414, 416 and 418, DTRC 472, STRC 440 and the buffer. The primary purpose of CC 470 is to centralize all the logic for interfacing to the context lists in the buffer for all the channels and to provide a means by which contexts can be passed very quickly from CAP 408 to a TRC that is retrieving and executing the context. For example, if an HTRC 412-418 is enabled to retrieve sequential contexts from the list to which CAP 408 is currently appending sequential contexts, and if this context list is currently empty so HTRC 412-418 is waiting for the next context which CAP 408 will generate, then CC 470 provides a means to provide the context directly to the HTRC that wants it, even as the context is being written to the buffer. To perform these operations, CC 470 acts like a single-entry cache of contexts. If the context in CC 470 is valid and the read request matches the pointer that is already in CC 470, then the context can be supplied immediately to the requesting TRC. The context may already be present in CC 470 when requested by the TRC. This saves latency and helps to reduce buffer bandwidth by reducing read accesses of contexts from the buffer.

In order for CAP 408 to create linked lists of contexts, it needs to allocate free pointers into the buffer that represents open slots where the new contexts can be written. To support this, a list of free pointers is maintained by Free Point Manager (FPM) 474. Initially, microprocessor 450 writes all the free pointers into the buffer list of free pointers and initializes FPM 474 to know where the table is located in the buffer. When CAP 408 requests pointers, FPM 474 supplies new pointers (depicted in FIGS. 4A-4C as signal "ptr") from this list. As RDMAs 434 or STRC 440 complete a context, the pointer is passed back to FPM 474, which writes it back into the buffer list. For read operations, pointer recycle requests are generated by RDMAs 434, for both status and non-status read contexts. For write operations, pointer recycle requests are generated by STRC 440, for both status and non-status write contexts.

FPM 474 registers requests from RDMAs 434 (via signal 479) and STRC 440 and muxes the register outputs to its buffer interface. This allows each input to queue one recycle request without having to wait for the operation to the buffer to complete.

Disk Thread Retrieval Channel (DTRC) 472 retrieves contexts from a list that is associated with the commands that Disk Formatter (DF) 478 is currently working on. The main goal of DTRC 472 is to track the sectors that DF 478 releases for this list of contexts and determine when DF 478 has completed each context. On writes, this information can be used to prompt STRC 440 to send status via SCM 424 after the data has been written to the disk. On both reads and writes, it can be used to detect when DF 478 has completed the transfer for this list of contexts. For example, when DF 478 has completed this list, a new seek can be initiated by microprocessor 450 for the next thread DF 478 should work on. Disk Transfer Counter (DXfer) 480 is the main counter in DTRC 472. DXfer 480 is loaded with the transfer length for each context that DTRC 472 retrieves from the buffer and decrements for each sector that DF 478 releases to the system until it reaches zero.

DTRC 472 also helps keep system 400 and disk sides aligned correctly depending on whether or not they are working on the same transfer. In the case that the architecture is transferring data with the buffer and DF 478 being started while a transfer is in progress, DTRC 472 contains Host Buffer Contents Counter (HBCC) 482 to Disk Buffer Contents Counter (DBCC) copy function that aligns the DBCC with the correct HTRC's HBCC 482. This alignment must be done in hardware so the DBCC does not miss any of the sectors that the host may be releasing to DF 478 at any moment. Likewise, if DF 478 is already performing the transfer while DF 478 is in progress, DTRC 472 contains counters, which can hold the sectors that have been missed until this point. As HBBC 482 is connected to DTRC 472, this pulse will be released to HBBC 482 such that HBBC 482 is now aware of all the sectors that DF 478 has released so far for the transfer.

STRC 440 retrieves contexts from a list of queued status contexts. These queued status contexts represent the write commands that DTRC 472 is completing. The goal of STRC 440 is to send the status after the data has been written to the disk. It can send status requests to either Port A or Port B, based on the Port ID bit in the context. It acts as a slave to DTRC 472 during write transfers. When DXfer counter 480 in DTRC 472 goes to zero, DTRC 472 can update the linked context list's End Pointer and optionally the linked context list's Read Pointer in STRC 440. In this way, status is queued in STRC 440 to be sent on FC/SAS bus and DTRC 472 is free to be reprogrammed for the next disk context/thread. For cached writes where FC/SAS Protocol Engine 402 is sending status immediately following the transfer of data into the buffer, STRC 440 is used to recycle the write contexts once DTRC 472 has completed the write contexts. On reads, STRC 440 is not needed since the protocol engine sends status on completion of the data instruction received from the HTRC via RCM 420, and RDMA 434 recycles the contexts.

An HTRC such as HTRCs 412-418 retrieves contexts from a list that is associated with the data transfers that host DMA will perform. There are four HTRC channels, which can be retrieved from four context lists in parallel. Normally, these four lists are reserved for the sequential automation list, two random writes automation lists, one for each port, and a list of contexts representing cached read data. However, each HTRC 412-418 is identical and can retrieve and execute any type of context list. Each HTRC 412-418 can issue instruction requests to either Port A or Port B based on the ID bit in the context. Each HTRC 412-418 has Host Buffer Contents Counter (HBCC) 482 that manages the quantity of sectors in the buffer across the entire context list that the HTRC is retrieving. Each HTRC 412-418 also has connected and non-connected HBCC 482 write and read thresholds that are compared against the HBCC along with other criteria to determine when the context should be enabled to start transferring on the FC/SAS bus. If the threshold is met, the length of the instruction request may still be for less than the size of the transfer length in the context. In this case, more than one instruction is issued for the given context. Once it is determined that an instruction should be issued, the HTRC adjusts the context transfer length by the size of the instruction (in sectors) and increments a cluster count register by the size of the instruction (in sectors). When this adjustment is complete, the instruction request is asserted.

WCM 422 is the interface between HTRCs 412-418 containing write contexts and the instruction block in FC/SAS Protocol Engine 402. WCM 422 takes requests (via signal 480) from HTRCs 412-418 for sending write instructions, arbitrates between requests, asserts an instruction request (via signal 481) to FC/SAS Protocol Engine 402 for the winning request, and passes the acknowledgement for the instruction request from FC/SAS Protocol Engine 402 back to the originating HTRC. HTRCs 412-418 only request to the port's WCM 422 specified in the context.

Any of the four HTRCs 412-418, which have a valid write context and have met threshold requirements for sending write instructions, assert an instruction request to the context specified port's WCM 422. When able, FC/SAS Protocol Engine 402 acknowledges the request. The WCM arbitration scheme guarantees that higher priority channels, which are active, win arbitration on back-to-back requests if the higher priority HTRC is ready to issue another instruction. The acknowledgement clears the instruction request and is routed to the originating HTRC to clear its request to WCM 422. In addition, an entry is made in PWT 426 for this write instruction.

RCM 420 is the interface between HTRCs 412-418 containing read contexts, PENG 432, RDMA 434, and the instruction block in FC/SAS Protocol Engine 402. RCM 420 takes requests (via signal 482) from HTRCs 412-418 for write instructions, arbitrates between the requests, loads the winning HTRC instruction to RDMA 434, asserts an instruction request (via signal 484) to FC/SAS Protocol Engine 402 for the winning request, copies the instruction to PENG 432 and RDMA 434, and passes the acknowledgement, for the instruction request, from FC/SAS Protocol Engine 402 to the HTRC. On this acknowledgement, the HTRC removes its instruction request to RCM 420. HTRCs 412-418 only request to the port's RCM 420 specified in the context.

The winner is copied to PENG 432 in order to start prefetching the buffer data before FC/SAS Protocol Engine 402 accepts the instruction. RCM 420 asserts a load request to PENG 432. The winner is also copied to RDMA 434. RCM 420 asserts a load request to RDMA 434.

The RCM instruction is not invalidated until FC/SAS Protocol Engine 402 instruction acknowledgement, PENG 432 load acknowledgement and RDMA 434 load acknowledgment. Once the instruction has been invalidated, RCM 420 is able to re-evaluate the HTRC instruction requests and load a new winner if one exists. RCM 420 can load a new instruction from a winning HTRC that is requesting with a read instruction, and load this instruction to PENG 432, while RDMA 434 and FC/SAS Protocol Engine 402 independently transfer data for the previous instruction. RDMA 434 and FC/SAS Protocol Engine 402 work dependently together to transfer the data from the TXB FIFO to the protocol bus.

SCM 424 is the interface between STRC 440 and the status instruction block in FC/SAS Protocol Engine 402. It takes a request from STRC 440 for sending write command status (via signal 485), asserts a status instruction request (via signal 486) to FC/SAS Protocol Engine 402, and then passes the acknowledgment for the instruction request from FC/SAS Protocol Engine 402 back to STRC 440.

STRC 440 asserts a request to either port's SCM 424. The request is given to the status instruction block in FC/SAS Protocol Engine 402. When it is able, FC/SAS Protocol Engine 402 accepts and acknowledges the request. This acknowledgement clears the instruction request and is routed to STRC 452 to clear its request to SCM 424.

PWT 426 is the interface between HTRCs 412-418 with write contexts, both WCMs 422 (via signal 487) and WDMA 428 (via signal 494). PWT 426 tracks write instructions, which have been issued to FC/SAS Protocol Engine 402, providing all of the context information necessary to transfer data to the external buffer.

PWT 426 contains a table of entries, each entry tracking one write instruction that has been issued via WCMs 422 to FC/SAS Protocol Engine 402 from an HTRC 412-418. Therefore, the number of entries matches the maximum number of outstanding write instructions in FC/SAS Protocol Engine 402 that are simultaneously possible on both ports.

PWT 426 contains eight entries. Four sets of four pointers, one set for each HTRC 412-418, are used to index the eight entries. Each HTRC 412-418 has a list that is managed by the four pointers: an add pointer, a release pointer, a base pointer, and a ceiling pointer. Using these pointers, PWT 426 is divided into four separate lists, one for each HTRC 412-418. An entry is added to this table when FC/SAS Protocol Engine 402 acknowledges a write instruction from WCM 422. The entry updated is the entry WDMA 428 must swap out when switching to a different write context. In this case, WDMA 428 also fetches the table entry for the new write context being transferred. An entry is marked "Done" when WMDA 428 has completed, without error, the data transfer corresponding to that entry.

PENG 432 is the interface between RCM 420, the buffer (via signal 488), and TxB 436 (via signal 489) It is loaded with the winning HTRC read instruction from RCM 420 and transfers data between the buffer and TxB 436.

An instruction is loaded into PENG 432 from RCM 420 when the prefetched instruction is not valid and RCM 420 has chosen a winner. Also, loaded from RCM 420 is the cluster length in sectors, the sector length in bytes, and the context read pointer. The prefetched instruction becomes valid when loaded. While valid, PENG 432 transfers data from the buffer to TxB 436. The instruction is invalidated when all the data has been transferred.

RDMA 434 is the interface between the data block in FC/SAS Protocol Engine 402 (via signal 490), RCM 420 and TxB 436 (via signal 491). It is loaded with the RCM instruction and monitors the data transfer between TxB 436 and the FC/SAS Protocol Engine 402.

A read instruction is loaded from RCM 420. While valid, RDMA 434 monitors data transfers from TxB 436 to FC/SAS Protocol Engine 402 for good data integrity. When the data transfer is complete, the RDMA instruction is invalidated and RDMA 434 is ready for another read instruction.

TxB 436 is a FIFO between PENG 432 and RDMA 434, which connects via RDMA 434 to FC/SAS Protocol Engine 402. TxB 436 contains read data coming from the buffer to FC/SAS Protocol Engine 402.

TxB 436 is loaded with read data from PENG 432. On the other side of TxB 436 is RDMA 434. When ready to transfer, RDMA 434 will transfer data from TxB 436. In order to keep a steady transfer of data to RDMA 434, TxB 436 will receive pre-fetched read data from PENG 432 and have it ready when RDMA 434 begins to send data to FC/SAS Protocol Engine 402. TxB 436 indicates to FC/SAS Protocol Engine 402 how much data is present but not yet committed to by FC/SAS Protocol Engine 402. FC/SAS Protocol Engine 402 indicates to TxB 436 when it is committing to transfer data from TxB 436, and how much data it is committing at each moment to transfer.

WDMA 428 is the interface between either port's FC/SAS Protocol Engine 402 (via signal 492), WCMs 422, PWT 426 and the buffer. WDMA 428 is loaded with an entry from PWT 426 and transfers data between either port's FC/SAS Protocol Engine 402 and the buffer (via signal 495).

A write instruction is stored (updated) from WDMA to PWT 426 when write data from FC/SAS Protocol Engine 402 appears with a different PWT entry number than that currently active in WDMA 428. Once the store is complete, a fetch of the new entry occurs from PWT 426. The instruction is valid when the fetch is complete. While valid, WDMA 428 transfers received write data from FC/SAS Protocol Engine 402 to the buffer.

Figure 6:
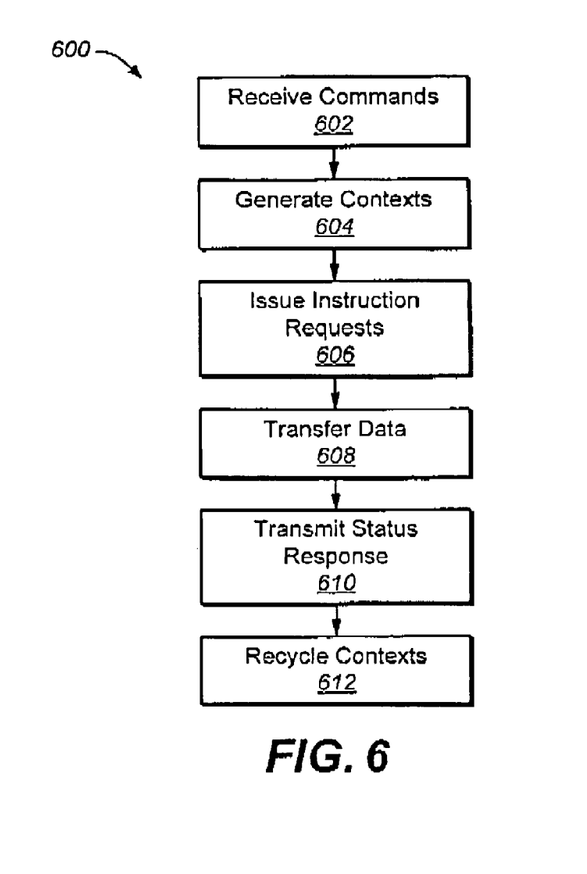
FIG. 6 is a flowchart that illustrates steps of a method for controlling the movement of data in a data processing system in accordance with a preferred embodiment of the present invention.

FIG. 6 is a flowchart that illustrates steps of a method for controlling the movement of data in a data processing system in accordance with a preferred embodiment of the present invention. The method is generally designated by reference number 600, and begins by receiving commands from at least one protocol engine (step 602). Contexts representing the commands are then generated (step 604), the contexts comprising a data structure that represents information for programming data transfers pursuant to the commands. Instruction requests are then issued to the at least one protocol engine to control the movement of data to/from the at least one protocol engine (step 606). Data is then transferred (step 608) and a status response for the command is transmitted (step 610). Upon completion of the data transfer and status response, the contexts are recycled for receipt of the next commands (step 612).

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A system for controlling movement of data in a data processing system, comprising:
   at least one protocol engine;
   at least one command FIFO, which is external to the at least one protocol engine, for receiving commands from the at least one protocol engine, the at least one command FIFO comprising one of an on-chip command FIFO and an off-chip command FIFO for storing data and for passing commands to at least one command automation processor, which is external to the at least one protocol engine;
   the at least one command automation processor determining if automation is enabled for the commands for eligibility to be automated by hardware;
   the at least one command automation processor passing commands for which automation is not enabled to a microprocessor for processing;
   the at least one command automation processor generating contexts that represent commands for which automation is enabled, and appending the contexts to a list of contexts;
   at least one context list retrieval channel for receiving contexts from the list of contexts, for determining when data represented by the contexts can be transferred, and for issuing instructions representing a specified amount of data that can be transferred;
   at least one read instruction context manager for receiving read instructions issued by each at least one context list retrieval channel, for arbitrating between each at least one context list retrieval channel, and for passing a winning read instruction to the at least one protocol engine and to at least one read DMA;
   at least one write instruction context manager for receiving write instructions from each at least one context list retrieval channel, for arbitrating between each at least one context list retrieval channel, and for passing a winning write instruction to the at least one protocol engine and to a pending write instruction table;
   the at least one command automation processor external to the at least one read instruction context manager and the at least one write instruction context manager;
   the at least one read DMA for receiving the winning read instruction from the at least one read instruction context manager, for moving the specified amount of data with the at least one protocol engine, and for notifying the at least one context list retrieval channel when the winning read instruction is complete;
   the at least one pending write instruction table for storing pending write instructions received from the write instruction context manager, for passing the pending write instructions to at least one write DMA, for receiving updates to the pending write instructions after the at least one write DMA has transferred pending write instruction data, and for providing feedback to the at least one context list retrieval channel when each pending write instruction is completed; and
   the at least one write DMA for receiving data from the at least one protocol engine and an identification identifying a pending write instruction to fetch, for fetching the identified pending write instruction from the pending write instruction table, for moving data with the at least one protocol engine, and for updating an associated pending write instruction table instruction.

2. The system according to claim 1, wherein the at least one read DMA includes a prefetch engine, a transmit FIFO, and a protocol read DMA, wherein the prefetch engine receives instructions from the read instruction context manager and prefetches data on-chip into the transmit FIFO before the protocol read DMA is ready to transfer the data, and wherein the protocol read DMA transfers data from the transmit FIFO to the at least one protocol engine.

3. The system according to claim 1, and further including means for sending a status after data is placed on a media during a write transfer.

4. The system according to claim 3, wherein the means for sending a status after data is placed on a media during a write transfer comprises:
   at least one media context retrieval channel for retrieving contexts from the list of contexts, for determining when data represented by the retrieved contexts has been written to the media, and for notifying the at least one status context retrieval channel regarding the existence of another context that is ready for a status response;
   at least one status context retrieval channel for retrieving contexts from the list of contexts that are ready for a status response and for issuing instructions that represent the received contexts to at least one status instruction context manager, and
   the at least one status instruction context manager for receiving instructions from the at least one status context retrieval channel, for arbitrating between the at least one status context retrieval channel, and for passing a winning instruction to the at least one protocol engine.

5. The system according to claim 1, and further including at least one free pointer manager for maintaining a list of pointers used for building linked lists of contexts, for allocating pointers on demand, and for recycling pointers from blocks which complete the execution of a context.

6. The system according to claim 5, wherein the pointers are allocated to the at least one command automation processor, and wherein the blocks which complete the execution of a context include a status context retrieval channel and a read DMA.

7. The system according to claim 1, and further including at least one context cache for providing an interface between a main storage for context lists and blocks that wish to access the main storage.

8. The system according to claim 7, wherein the blocks that wish to access the main storage include means for providing a write buffer cache and/or a read cache capability for optimizing performance of write and/or read accesses to the main storage for context lists.

9. The system according to claim 1, further comprising: a plurality of ports, and wherein a protocol engine is associated with each of the plurality of ports.

10. The system according to claim 1, wherein the at least one protocol engine comprises a Fibre Channel/Serial Attached SCSI interface protocol engine.

11. A method for controlling movement of data in a data processing system that includes at least one protocol engine, and an architecture that interfaces with the at least one protocol engine, the method comprising:

at least one context list retrieval channel receiving contexts from a list of contexts, determining when data represented by the contexts can be transferred, and issuing instructions representing a specified amount of data that can be transferred;

the data processing system further including at least one command FIFO, which is external to the at least one protocol engine, for receiving commands from the at least one protocol engine, the at least one command FIFO comprising one of an on-chip command FIFO and an off-chip command FIFO for storing data and for passing commands to at least one command automation processor, which is external to the at least one protocol engine;

the at least one command automation processor determining if automation is enabled for the commands for eligibility to be automated by hardware;

the at least one command automation processor passing commands for which automation is not enabled to a microprocessor for processing;

the at least one command automation processor generating contexts that represent commands for which automation is enabled, and appending the contexts to a list of contexts;

at least one read instruction context manager receiving read instructions issued by each of the at least one context list retrieval channel, arbitrating between each of the at least one context list retrieval channel, and passing a winning read instruction to the at least one protocol engine and to at least one read DMA;

at least one write instruction context manager receiving write instructions from each of the at least one context list retrieval channel, arbitrating between each of the at least one context list retrieval channel, and passing a winning write instruction to the at least one protocol engine and to a pending write instruction table;

the at least one command automation processor external to the at least one read instruction context manager and the at least one write instruction context manager;

the at least one read DMA receiving the winning read instruction from the at least one read instruction context manager, moving the specified amount of data with the at least one protocol engine, and notifying the at least one context list retrieval channel when the winning read instruction is complete;

the at least one pending write instruction table storing pending write instructions received from the write instruction context manager, passing the pending write instructions to at least one write DMA, receiving updates to the pending write instructions after the write DMA has transferred some or all of the instruction's data, and providing feedback to the at least one context list retrieval channel when each instruction is completed; and the at least one write DMA receiving data from the at least one protocol engine and an identification identifying a pending write instruction to fetch, fetching the identified write instruction from the pending write instruction table, moving data with the at least one protocol engine, and updating an associated pending write instruction table instruction.

12. The method according to claim 11, wherein the read DMA includes a prefetch engine, a transmit FIFO, and a protocol read DMA, and wherein the prefetch engine receives instructions from the read instruction context manager and prefetches data on-chip into the transmit FIFO before the protocol read DMA is ready to transfer the data, and wherein the protocol read DMA transfers data from the transmit FIFO to the at least one protocol engine.

13. The method according to claim 11, wherein the system further includes means for sending a stabs after data is placed on a media during a write transfer that comprises:

at least one media context retrieval channel retrieving contexts from the list of contexts, determining when data represented by the retrieved contexts has been written to the media, and notifying the at least one status context retrieval channel regarding the existence of another context that is ready for a status response;

at least one status context retrieval channel retrieving contexts from the list of contexts that are ready for a status response and issuing instructions that represent the received contexts to at least one status instruction context manager; and the at east one status instruction context manager receiving instructions from the at least one status context retrieval channel, arbitrating between the at least one status context retrieval channel, and passing a winning instruction to the at least one protocol engine.

14. The method according to claim 11, wherein the system further includes at least one free pointer manager maintaining a list of pointers used for building linked lists of contexts, allocating pointers on demand, and recycling pointers from blocks which complete the execution of a context.

* * * * *